United States Patent
Mills

(10) Patent No.: US 7,033,430 B2
(45) Date of Patent: Apr. 25, 2006

(54) CEMENT-CONTAINING COMPOSITIONS AND METHOD OF USE

(75) Inventor: Peter S. Mills, Stamping Ground, KY (US)

(73) Assignee: Minova International Limited, Witan Way Witney, Oxfordshire (GB)

( * ) Notice: Subject to any disclaimer, the term of this patent is extended or adjusted under 35 U.S.C. 154(b) by 0 days.

(21) Appl. No.: 10/432,727

(22) PCT Filed: Nov. 28, 2001

(86) PCT No.: PCT/GB01/05241

§ 371 (c)(1),
(2), (4) Date: Jul. 14, 2003

(87) PCT Pub. No.: WO02/44100

PCT Pub. Date: Jun. 6, 2002

(65) Prior Publication Data

US 2004/0050300 A1    Mar. 18, 2004

Related U.S. Application Data

(60) Provisional application No. 60/253,091, filed on Nov. 28, 2000.

(51) Int. Cl.
*C04B 14/04*    (2006.01)
*C04B 12/04*    (2006.01)
*C04B 28/26*    (2006.01)
*C04B 40/00*    (2006.01)

(52) U.S. Cl. ............ 106/606; 106/607; 106/608; 106/705; 106/706; 106/708; 106/709; 106/713; 106/724

(58) Field of Classification Search ........... 106/606, 106/607, 608, 705, 706, 708, 709, 713, 724
See application file for complete search history.

(56) References Cited

U.S. PATENT DOCUMENTS

| 3,672,173 A | 6/1972 | Paramore .............. 166/293 |
| 3,928,052 A | 12/1975 | Clement Jr. ............ 106/607 |
| 4,396,723 A * | 8/1983 | Temple et al. .......... 501/80 |
| 4,655,837 A | 4/1987 | Jong .................. 106/601 |
| 4,984,933 A | 1/1991 | Annett et al. .......... 405/150.2 |
| 5,378,278 A * | 1/1995 | Colburn ............... 106/709 |
| 5,454,866 A | 10/1995 | Gilbert et al. .......... 106/695 |
| 5,645,375 A | 7/1997 | Stephens ............... 405/146 |

FOREIGN PATENT DOCUMENTS

| DE | 42 05 354 | | 8/1993 |
| EP | 0 974 563 | | 1/2000 |
| GB | 2157280 A | * | 10/1985 |
| JP | 53-137517 A | * | 12/1978 |
| JP | 05-222367 A | * | 8/1993 |
| JP | 09-118557 | * | 7/1997 |

OTHER PUBLICATIONS

Derwent Abstract No. 1993-107840, abstract of Soviet Union Patent Specification No. 1726731A1 (Apr. 1992).*
DATABASE WPI, 1993 & JP 05 222367.
DATABASE WPI, 1997 & JP 09 118557.

* cited by examiner

*Primary Examiner*—Anthony J. Green
(74) *Attorney, Agent, or Firm*—Nixon & Vanderhye, PC

(57) ABSTRACT

A settable fluid cementitious composition which is fluid for sufficient time to be suitable for use in a flexible container to provide support in a mine said composition comprises (i) Portland cement in an amount from at least about 8% preferably 10%, (ii) a water soluble silicate in an amount from at least about 2% and (iii) water in an amount to provide a water to solids weight ratio of at lest about 1.2:1 preferably at least abou5 1.5:1 and where the % are by weight based on the combined weights of (i), (ii) and (iii). The viscosity immediately after mixing the components together is sufficiently low that additional water can be incorporated. The composition may include (iv) a pozzolan in an amount from 2 to 35% by weight based on the combined weight of (i), (ii), (iii) and (iv).

12 Claims, No Drawings

CEMENT-CONTAINING COMPOSITIONS AND METHOD OF USE

This application is the US national phase of international application PCT/GB01/05241 filed 28 Nov. 2001 which designated the which claims the benefit of U.S. Provisional Application No. 60/253,091, filed on 28 November 2000.

This invention relates to cement-containing compositions, to a method for their preparation and to a method in which they are used.

Cement-containing compositions, sometimes referred to as grouts, have been extensively used in mines principally to provide support. A mine roof, once exposed, will normally lower to some extent and it has therefore been the practice to place passive supports beneath it to control the lowering. These supports have to be able to deform whilst maintaining a good load bearing capacity, typically a few hundred pounds per square inch (p.s.i.). Traditionally this requirement has been met with the use of high water content grouts, pumped into a flexible container, sometimes referred to as a bag, which after the cement has set deforms plastically under load. The cement has previously been of a type that forms a considerable amount of Ettringite quickly, for example, materials sold under the trade marks Tekpak, Hydropack and Aquapak. The Ettringite-forming grouts have been based on mixtures of aluminous cement, calcium sulphate and a source of lime. Usually the aluminous cement is pumped as a slurry separate from the calcium sulphate/lime mixture in order to provide a two component grout with an extended working life for each component. Combining the two components causes setting within a few minutes. Very high water/solids ratios have been employed so that the slurries are of low viscosity in order that they may be pumped significant distances e.g. up to 10 kilometres through small diameter pipelines to the point of use.

It has also been previously proposed to employ the reaction between an alkali metal silicate and Portland cement to produce a load bearing material for providing support in mines.

For example U.S. Pat. No. 3,672,173 describes the production of self supporting barriers in mine passages which involves mixing an aqueous slurry containing a Portland cement with an aqueous solution of a silicate such as an alkali metal silicate at the location where it is desired to form the barrier. The resulting mixtures are said to be quick setting and set as they are being deposited so that they may be continuously deposited on portions of the floor and walls of remote mine passages to form water impermeable barriers that do not require the use of forms.

U.S. Pat. No. 4,984,933 describes a grout having anti washout properties prepared from (a) a cement such as ordinary Portland cement and a pozzolanic or like material such as flyash, blast furnace slag or the like and (b) a gelling agent such as sodium silicate, aluminium sulphate, magnesium sulphate or the like and (c) an anti washout retarder eg a natural or synthetic polymer which will surround the particles of the cement to protect such particles from being washed out by the water present in the void into which the grout is placed. The quantity of gelling agent in relation to the dry cement can be up to 8%.

U.S. Pat. No. 3,928,052 describes a pumpable cement-containing slurry which will not set while being agitated but which rapidly sets in a static condition which slurry contains a cement such as Portland cement, a metal silicate compound, a base to retard gelling of the silicate, a salt to reduce the viscosity and sufficient water to form the composition into a pumpable slurry. The slurry may be pumped for several hours but when agitation is stopped for more than 5 minutes, the slurry begins to form a rigid gel and which cannot be sheared thin after about 30 minutes. It is disclosed that in the preparation of the slurry, the silicate, base and salt may be dissolved in a portion of the water to be used and the cement mixed with the remaining portion of water and then the first portion containing the silicate, base and salt is combined with the cement-water mixture to form the final slurry.

The reaction of Portland cement with alkali metal silicates has also been previously described in U.S. Pat. No. 4,655,837 which describes the production of lightweight building blocks containing pores formed by the production of gaseous hydrogen. The blocks are made from compositions containing from 70 to 94 parts of Portland cement, 10 to 30 parts of Gypsum, 1 to 3 parts of sodium hydroxide, 150 to 275 parts of saturated sodium silicate solution, 1/4 to 1 1/2 parts of aluminium or zinc and 2 to 5 parts of an acidic ingredient, all parts being by weight.

None of these earlier patents disclose a method of providing support in which the grout obtained by mixing the cement-containing component with the silicate-containing component is supplied to a flexible container in a manner that allows the container and its contents to deform to the contours of the mine surface. Nor do these patents disclose a grout that is fluid for a sufficient length of time to deform the container to the contours of the mine surface and therefore be suitable for use in such a method.

There is a need for an improved method of providing support in a mine which can reduce or avoid the use of aluminous cements which are relatively expensive and which also provides a grout which is fluid for sufficient time to enable the grout, when supplied to a flexible container, to deform the container to the contours of the mine surface. This ability to deform and seal against the mine surfaces is particularly important when it is desired to ensure an even load distribution and also when it is desired to form an air or gas tight partition in the mine.

The present invention provides a solution to this problem by the provision of a first component comprising a Portland cement and water and preferably a retarder for the cement hydration reaction and preferably also a suspension agent to prevent solids settling out and a second component comprising an aqueous silicate solution and the supply of the components to the place of use, where they are mixed to form a grout and the supply of the grout so formed to a flexible container capable of deforming to the contours of the mine surface.

According to the present invention there is provided a settable cementitious composition which is fluid for sufficient time to be suitable for use in a flexible container to provide support in a mine said composition comprising (i) Portland cement in an amount from at least about 8%, preferably at least about 10%, more preferably at least about 12%

(ii) a water soluble silicate, preferably an alkali metal silicate, in an amount from at least about 2% and (iii) water in an amount to provide a water to solids weight ratio of at least about 1.2:1 preferably at least about 1.5:1 more preferably at least about 2:1 and where the % are by weight based on the combined weights of (i), (ii), and (iii).

According to another aspect of the invention there is provided a method of producing a settable composition which is fluid for sufficient length of time to be suitable for use in a flexible container for providing support in mine, which method comprises providing a first component comprising Portland cement, water and preferably a retarder for the cement hydration reaction and preferably also a suspension agent to prevent solids settling out and providing a second component comprising a solution of a silicate in water and mixing the first and second components together to form a settable composition having a minimum solids content of at least about 10%, preferably at least about 12%, more preferably at least about 20% by weight and a water to solids weight ratio of at least about 1.2:1, preferably at least about 1.5:1, more preferably at least about 2:1.

The compositions of the invention can be provided in the form of two streams of high water content (a slurry containing the Portland cement and a solution containing the silicate) to be mixed. The composition obtained from mixing the two streams is suitable for use as a mine support with a flexible container and results in improved contact with the mine roof and therefore improved support characteristics. In addition it has been found advantageous to include a suspension agent in the cement slurry. This surprisingly allows delivery pipes to be left full of slurry under static conditions for many hours and remain pumpable.

For the formation of grouts it is known to use beta anhydrite in one stream (in the form of a slurry) and high alumina cement in the other. When conventional retarders are present in the high alumina cement slurry it has been possible to obtain a three day pumping life. With the addition of further retarder it becomes more difficult to effect setting. However it has unexpectedly been found by the present inventors that when a high water content Portland cement slurry containing a retarder is used in place of the more expensive high alumina cement, setting can be effected by a silicate solution and good strength can be achieved even at water to solids weight ratios of 2:1 or more.

The term mine in the present specification is intended to include quarries, tunnels and all underground earthworks.

The term Portland cement in the present specification means a cement which contains tricalcium silicate and dicalcium silicate which combined constitute at least 50% by weight of the cement.

The term pozzolan is intended to include non aluminous cements such as blast furnace slag, flyash, metakaolin and silica fume.

Portland cement as supplied by the manufacturer contains one or more materials such as gypsum (which is typically present in an amount of about 5% to prevent flash setting) which may be considered to act as retarders. The term retarder for the cement hydration reaction in the present specification therefore refers to a material such as a gluconate that is not present in Portland cement as supplied by the manufacturer and which retards the hydration of the dicalcium and tricalcium silicates.

The term pumpable means capable of being pumped by conventional pumps as used in the mining industry.

The term solids in the phrase water to solids ratio refers to both dissolved and undissolved solids.

References to the amount of water in compositions that lose water with passage of time are to the amount of water in the composition immediately after mixing the ingredients together.

The term self levelling is intended to mean that the compositions will flow under their own weight.

The flexible container employed in the present invention may be as described in WO97/47859 the disclosure of which is hereby incorporated by reference. The published application discloses a container which comprises a tubular member conveniently made of steel having at its ends rubber diaphragms which are capable of being inflated and stressed against the roof and floor of the mine by the introduction of a pumpable load bearing material, the diaphragms being sufficiently flexible to follow the surface irregularities in the roof and floor of the mine.

The amount of water (iii) by weight in the settable composition is preferably from 65% to 85% based on the combined weight of (i), (ii) and (iii).

The component containing the Portland cement which is in the form of a slurry preferably contains a retarder for the cement hydration reaction and preferably also a suspension agent to facilitate pumpability, e.g. a polysaccharide gum or bentonite or finely divided amorphous silica.

The settable composition may contain (iv) other non aluminous cements for example blast furnace slag conveniently in ground granulated form known in the art as GGBFS, flyash which may be class C or class F, metakaolin, silica fume or another pozzolan, the amount of which may be up to 35%, preferably up to 20% by weight of the combined weight of (i), (ii), (iii) and (iv).

Typical amounts are in the range from 2% preferably 4% to 15% by weight.

The settable compositions develop a compressive strength as follow:

at 2 hours of at least 10 psi, preferably at least 15 psi,
at one day of at least 50 psi, preferably at least 100 psi, and
at 7 days at least 100 psi preferably at least 150 psi more preferably at least 200 psi. Storage is at 20 degrees Centigrade.

According to a further aspect of the present invention there is provided a method of providing support in a mine which method comprises providing two streams as hereinbefore defined and pumping the streams to the point of use, mixing the slurries to form a grout and employing the grout to give support in the mine.

Suitable silicates for use in the present invention may be any of those described in U.S. Pat. Nos. 3,672,173: 4,984,933; 3,928,052 and 4,655,837.

Preferred silicates are alkali metal silicates and preferred ratios of silica to sodium oxide are from 1.5 to 3.3 to 1.

According to a further aspect of the invention there is provided a system comprising two components to be mixed together to form a settable composition each component being pumpable for at least 4 hours, preferably at least 24 hours, more preferably at least 48 hours, most preferably at least 72 hours when stored at 15° C. under static conditions a first component comprising
  (a) Portland cement and
  (b) water and preferably a retarder for the cement hydration reaction and preferably also a suspension agent to prevent solids settling out in a weight ratio of water to Portland cement solids of from 0.5:1 to 5:1 the second component comprising
  (c) a water soluble silicate and
  (d) water, in a weight ratio of water to silicate solids of from 1.5:1 to 25:1.

The invention is illustrated by the following Examples which describe the preparation of fluid settable compositions which are of sufficiently low viscosity (a dynamic viscosity of below about 100 centipoise) immediately after mixing to be able to incorporate additional water and which are flowable or self levelling. The compositions gelled in about 30 seconds.

After gelling none of the settable compositions formed in the Examples exhibited bleeding.

EXAMPLE 1

TABLE 1

| Component A | % in mix | Component B | % in mix |
|---|---|---|---|
| Type 1 Portland cement | 30.89 | 38% sodium silicate (3.3:1 silica/sodium oxide) | 30.88 |
| GGBFS | 12.61 | | |
| Welan gum | 0.10 | | |
| Sodium gluconate | 0.50 | | |
| Water | 55.61 | Water | 69.11 |

Welan gum is a suspension agent to prevent settling out of the cement solids and thereby facilitate pumpability after storage under static conditions.

Sodium gluconate is a retarder for the hydration reaction of the Portland cement.

Type 1 is a designation for Portland cement used in the USA according to ASTM C150-00.

The amount of GGBFS based on the total weight of A and B was 6%.

Component A in the form of a slurry and component B in the form of a solution were prepared from the individual ingredients shown in Table 1.

Component A was prepared by first blending the Portland cement, Welan gum, GGBFS and gluconate and the mixture thus formed (which was in the form of a powder) then added to the water. Component A was prepared in this way in all the Examples ie a dry powder was prepared and added to the water.

Component B had an indefinite pumping life and Component A had a pumping life of several weeks when stored at 15° C. under static conditions i.e. without agitation.

Components A and B were mixed together in equal volume to give a fluid self levelling composition to which additional water could be readily incorporated. The water to solids ratio by weight was 2.38:1.

The fluid composition was pumped into a flexible container as described in WO 97/47859 located in a mine to inflate the latter into sealing contact with the contours of the mine roof and floor.

A measurement of uniaxial compressive strength was carried out. 100 mm cubes of the set grout were prepared in foamed polystyrene molds and their compressive strength measured at different ages using a standard compressive test machine.

This method was used in all the Examples.

The compressive strengths after storage at 20 degrees Centigrade were as follows:

| | |
|---|---|
| 2 hours | 40 psi |
| 1 day | 392 psi |
| 7 days | 650 psi |
| 28 days | 889 psi. |

At 28 days the specimen yielded in a non brittle manner. To be effective when used as a mine support it is desirable that the compositions yield under load and do not fail in a brittle manner.

EXAMPLE 2

This Example described a composition which is lean in Portland cement and is, not according to the invention and is included for comparative purposes only.

TABLE 2

| Component A | % in mix | Component B | % in mix |
|---|---|---|---|
| Type 1 Portland cement | 9.60 | 38% sodium silicate (3.3:1 silica/sodium oxide) | 23.55 |
| GGBFS | 38.46 | | |
| Welan gum | 0.10 | | |
| Sodium gluconate | 0.10 | | |
| Water | 51.92 | Water | 76.45 |

Example 1 was repeated but with different amounts of the individual ingredients as shown in Table 2.

Component A was formed by mixing the ingredients in the same order as described in Example 1.

Components A and B were pumpable for at least 24 hours when stored at 15 degrees centigrade under static conditions.

Components A and B were mixed together in equal volumes to give a settable composition having water to solids weight ratio of 2.27:1.

The amount of GGBFS based on the total weight of A and B was 19.9%.

The composition was mixed and pumped onto a flexible container as described in Example 1.

The uniaxial compressive strength was measured as described in Example 1. The strength at 2 hours was too low to be recordable and the strength at one day was only 176 psi. A strength of at least about 10 to 15 psi is usually considered necessary for the grout to stand up without support.

EXAMPLE 3

This Example is according to the invention shows the effect of increasing the amount of Portland cement.

TABLE 3

| Component A | % in mix | Component B | % in mix |
|---|---|---|---|
| Type 1 Portland cement | 19.2 | 38% sodium silicate (3.3:1 silica/sodium oxide) | 23.55 |
| GGBFS | 28.826 | | |
| Welan gum | 0.10 | | |
| Sodium gluconate | 0.10 | | |
| water | 51.77 | Water | 76.45 |

Components A and B were prepared using the amounts of the individual ingredients shown in Table 3. Both components were pumpable after at least 24 hours when stored under static conditions at 15 degrees Centigrade.

The components were mixed in equal volumes to give a fluid self levelling settable composition to which additional water could readily be incorporated.

The amount of GGBFS in the composition was 14.9%. The water to solids weight ratio was 2.27:1. The composition gelled in about 30seconds.

The composition was pumped into a flexible container as described in Example 1.

The compressive strengths were as follows:

2 hours 5.7 psi. This is too low to provide support.

1 day 675 psi 7 days 1171 psi. This was too brittle and did not yield under load.

EXAMPLE 4

This Example which is according to the invention shows the effect of omitting the pozzolan from the composition.

TABLE 4

| Component A | % in mix | Component B | % in mix |
|---|---|---|---|
| Type 1 Portland cement | 42.2 | 38% sodium silicate (3.3:1 silica/sodium oxide) | 31.5 |
| bentonite | 0.53 | | |
| Welan gum | 0.05 | | |
| Sodium gluconate | 0.16 | | |
| water | 57.0 | Water | 68.5 |

Components A and B were prepared using the amounts of the individual components shown in Table 4.

Both components were pumpable after being stored for at least 24 hours under static conditions at 15 degrees Centigrade.

The components were mixed in equal volumes to give a fluid self levelling settable composition to which additional water could be readily incorporated. The water to solids weight ratio was 2.47:1.

The composition was pumped into a flexible container as described in Example 1.

The compressive strengths measured were as follows:

2 hours 92 p.s.i.

1 day 303 p.s.i.

7 days 135 p.s.i. i.e. a strength reduction which is undesirable.

EXAMPLE 5

This Example is according to the invention

TABLE 5

| Component A | % in mix | Component B | % in mix |
|---|---|---|---|
| Type 1 Portland cement | 31.8 | 38% sodium silicate (3.3:1 silica/sodium oxide) | 31.5 |
| Class C flyash | 10.6 | | |
| Welan gum | 0.05 | | |
| bentonite | 0.26 | | |
| Sodium gluconate | 0.10 | | |
| water | 57.3 | Water | 68.5 |

Components A and B were prepared using the amounts of the individual ingredients shown in Table 5.

Both components were pumpable after being stored for at least 24 hours at 15 degrees Centigrade under static conditions. The components were mixed in equal volumes to give a fluid settable composition which was self levelling. The composition had a water to solids weight ratio of 2.48:1. The composition was pumped into a flexible container as described in Example 1.

The compressive strengths developed were as follows:

| 2 hours | 35 psi |
| 1 day | 332 psi |
| 7 days | 415 psi |

Examples 4 and 5 show the benefit (strength continues to increase between 1 and 7 days) of including a pozzolan in the formulation.

Further advantages of the compositions of the invention as illustrated in the above Examples are (i) that the aluminous and sulphoaluminous cements of the prior art cost approximately three or four times as much as ordinary Portland cement. The ordinary Portland cement containing compositions of the invention therefore give a significant economic benefit.

(ii) with previously used grouts formed from a component containing an aluminous cement and another component containing calcium sulphate and a source of lime, it has not been found possible to consistently retard the hydration of the two components beyond about 3 days and still obtain an adequate speed of setting on mixing the two components together. This means there is a risk of blockage of the delivery pipes for the two components if left to stand over weekends. The components used in the above Examples have improved stability, in some cases over 2 weeks, and significantly lessen the above mentioned problem.

(iii) the settable compositions of the present invention do not bleed.

The invention claimed is:

1. A two part settable fluid cementitious composition which is fluid when mixed for sufficient time to be suitable for use in a flexible container to provide support in a mine, said composition comprising:

(i) a first part comprising Portland cement in an amount from at least about 8% and water;

(ii) a second part comprising a water soluble silicate in an amount from at least about 2% and water; and wherein said water in the first and second parts is present in an amount to provide a water to solids weight ratio of at least about 1.5:1 and wherein the % are by weight based on the combined weights of (i) and (ii).

2. A composition as claimed in claim 1 which exhibits a viscosity immediately after mixing the first and second components together which is sufficiently low that additional water can be incorporated.

3. A composition as claimed in claim 1, further comprising (iii) a pozzolan in an amount from 2 to 35% by weight based on the combined weight of (i), (ii) and (iii).

4. A composition as claimed in claim 1 wherein the composition has a strength after 2 hours of at least 10 p.s.i.

5. A composition as claimed in claim 1 wherein the composition has a strength after 1 day of at least 50 p.s.i.

6. A composition as claimed in claim 1 wherein the composition has a strength after 7 days of at least 100 p.s.i.

7. A composition as claimed in claim 1, wherein the Portland cement is present in an amount from at least 10%.

8. A method of providing support in a mine which method comprises providing the two part composition comprised of the first and second components as claimed in claim 1, pumping the first and second components to a place of use, mixing the first and second components to form a grout, and supplying the grout to a flexible container to inflate the container to provide support in the mine.

9. A method of producing a settable composition which is fluid for sufficient length of time to be suitable for use in a flexible container for providing support in mine, which method comprises:

(i) providing a first component comprising Portland cement, water;

(ii) providing a second component comprising a solution of a silicate in water; and (iii) mixing the first and second components together to form a settable composition having a minimum solids content of at least 10% by weight and a water to solids weight ratio of at least about 1.5:1.

10. A method as claimed in claim 9 wherein the first component includes a suspension agent to reduce settling out and improve pumpability after standing.

11. A method as claimed in claim 9 wherein the first component includes a retarder for the cement hydration reaction.

12. A system comprising first and second components to be mixed together to form a settable composition, wherein the first component comprises:
   (a) Portland cement;
   (b) water, the weight ratio of water to Portland cement being from 0.5:1 to 5:1;
   (c) a retarder for the cement hydration reaction; and
   (d) a suspension agent, and wherein the second component comprises:
   (e) a water soluble silicate; and
   (f) water in an amount to provide a weight ratio of water to silicate solids of from 1.5:1 to 25:1.

* * * * *